(12) United States Patent
Huang

(10) Patent No.: US 9,531,943 B2
(45) Date of Patent: Dec. 27, 2016

(54) BLOCK-BASED DIGITAL REFOCUSING SYSTEM AND METHOD THEREOF

(71) Applicant: NATIONAL TSING HUA UNIVERSITY, Hsinchu (TW)

(72) Inventor: Chao-Tsung Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/623,466

(22) Filed: Feb. 16, 2015

(65) Prior Publication Data

US 2016/0165122 A1 Jun. 9, 2016

(30) Foreign Application Priority Data

Dec. 3, 2014 (TW) .............................. 103142034 A

(51) Int. Cl.
*H04N 5/232* (2006.01)
*H04N 5/357* (2011.01)
*G06K 9/46* (2006.01)
*G06T 5/50* (2006.01)
*G06T 7/00* (2006.01)
*G06T 5/00* (2006.01)

(52) U.S. Cl.
CPC ............ *H04N 5/23212* (2013.01); *G06K 9/46* (2013.01); *G06T 5/003* (2013.01); *G06T 5/50* (2013.01); *H04N 5/357* (2013.01); *G06K 2009/4666* (2013.01); *G06T 2200/21* (2013.01); *G06T 2207/10052* (2013.01)

(58) Field of Classification Search
CPC H04N 5/32312; H04N 5/357; H04N 13/0282; H04N 5/23229; G06K 9/46; G06K 2009/4666; G06T 7/0051; G06T 2200/21; G06T 2207/10052

USPC ........ 382/164, 171, 173, 254, 255; 348/345, 348/349, 359
See application file for complete search history.

(56) References Cited

U.S. PATENT DOCUMENTS

| | | | | |
|---|---|---|---|---|
| 8,259,217 | B2 * | 9/2012 | Chou | G03B 13/36 348/349 |
| 8,743,245 | B2 * | 6/2014 | Hiasa | H04N 13/0011 250/201.2 |
| 9,077,886 | B2 * | 7/2015 | Hayasaka | H04N 5/2254 |
| 2006/0061678 | A1 * | 3/2006 | Yamazaki | H04N 5/23212 348/345 |
| 2011/0019206 | A1 | 1/2011 | Wright et al. | |

(Continued)

FOREIGN PATENT DOCUMENTS

| | | |
|---|---|---|
| CN | 104079827 A | 10/2014 |
| TW | 201336300 A | 9/2013 |

*Primary Examiner* — Tuan Ho
*Assistant Examiner* — Marly Camargo
(74) *Attorney, Agent, or Firm* — CKC & Partners Co., Ltd.

(57) ABSTRACT

A block-based digital refocusing method includes a capturing step, a dividing step, a selecting step, a refocusing step and a combining step. The capturing step is for capturing at least one picture datum. The dividing step is for dividing the picture datum into a plurality of block data. The selecting step is for defining a regional datum according to each of the block data. The refocusing step is for conducting a refocusing computation to obtain a refocused block datum according to each of the regional data. The combining step is for combining each of the refocused block data based on each of the regional data to form a refocused picture datum.

16 Claims, 8 Drawing Sheets

(56) References Cited

U.S. PATENT DOCUMENTS

2013/0044234 A1\* 2/2013 Nagano .............. H04N 5/23212
                                                      348/222.1
2016/0112625 A1\* 4/2016 Namiki .............. H04N 5/23212
                                                      348/239

\* cited by examiner

US 9,531,943 B2

BLOCK-BASED DIGITAL REFOCUSING SYSTEM AND METHOD THEREOF

RELATED APPLICATIONS

This application claims priority to Taiwan Application Serial Number 103142034, filed Dec. 3, 2014, which is herein incorporated by reference.

BACKGROUND

Technical Field

The present disclosure relates to a digital refocusing system and a digital refocusing method. More particularly, the present disclosure relates to a block-based digital refocusing system and a block-based digital refocusing method.

Description of Related Art

With rapid development of digital cameras, the user can freely take desired images or videos. In order to highlight the main object, a shallow depth of field technique is usually used to produce the images with clear object and blurred background, so that the digital refocusing camera has become a new trend. In general, there are two ways to implement the digital refocusing camera. One is the commercial light field camera, such as Lytro or Raytrix. Another s the depth map produced by the computer vision method, wherein the depth map and the original picture are used to generate the shallow depth of field image, such as HTC M8 Duo Camera or Google Camera App.

One conventional shallow depth of field technique utilizes a ray-tracing method that is a three-dimensional rendering process of synthesizing data of a 3D object into an image observed at a given viewpoint of a camera. However, the computation of this ray-tracing method is too high to implement real-time refocusing. Another conventional shallow depth of field technique uses the light, field method with view interpolation to generate real-photo quality. However, the computation of this light field method is still too large to accomplish on portable devices. Further another conventional shallow depth of field technique utilizes an adaptive filter to generate the depth information that the blur kernel size is correlated with the depth value. Unfortunately, the adaptive filter will produce a discontinuity phenomenon in the foreground when the background is in focus. Yet another conventional shallow depth of field technique uses the layered depth map to perform hierarchical pictures. However, when the aperture is large, there is still a distorted phenomenon in the picture, wherein the apparent distortion will appear in large changes of the depth map. Therefore, a digital refocusing system and method having fast computation, real-time response and real-photo quality is commercially desirable.

SUMMARY

According to one aspect of the present disclosure, a block-based digital refocusing method includes a capturing step, a dividing step, a selecting step, a refocusing step and a combining step. The capturing step is provided for capturing at least one picture datum. The dividing step is provided for dividing the picture datum into a plurality of block data. The selecting step is provided for defining a regional datum according to each of the block data. The refocusing step is provided for conducting a refocusing computation to obtain a refocused block datum according to each of the regional data. The combining step is provided for combining each of the refocused block data based on each of the regional data.

According to another aspect of the present disclosure, a block-based digital refocusing system includes a capturing module and an mage processing module. The capturing module is for capturing at least one picture datum. The image processing module is signally connected to the capturing module. The image processing module includes a dividing unit, a selecting unit, a refocusing unit and a combining unit. The dividing unit is for dividing the picture datum into a plurality of block data. The selecting unit is for defining a regional datum according to each of the block data. The refocusing unit is for conducting a refocusing computation to obtain a refocused block datum according to each of the regional data. The combining unit is for combining each of the refocused block data based, on each of the regional data to form a refocused picture datum.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
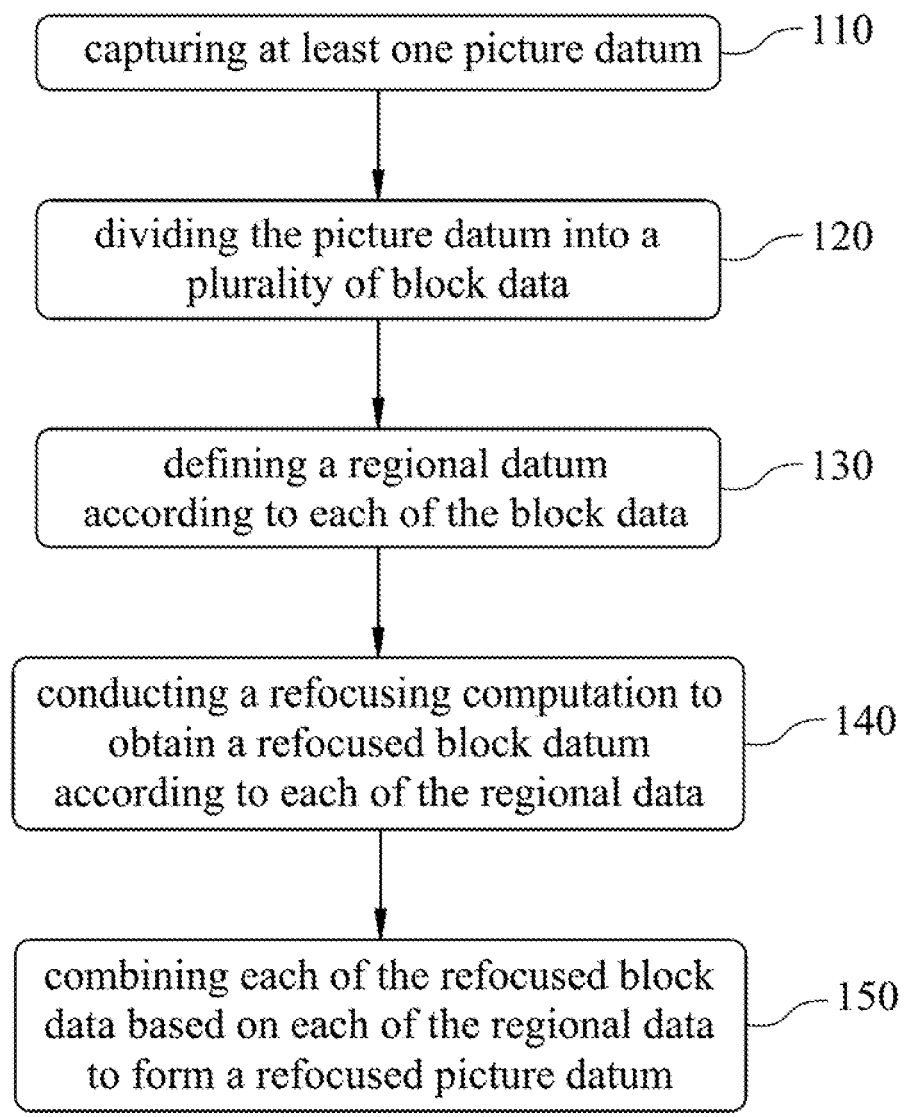
FIG. 1 shows a flow chart of a block-based digital refocusing method according to one embodiment of the present disclosure.
Figure 2A:
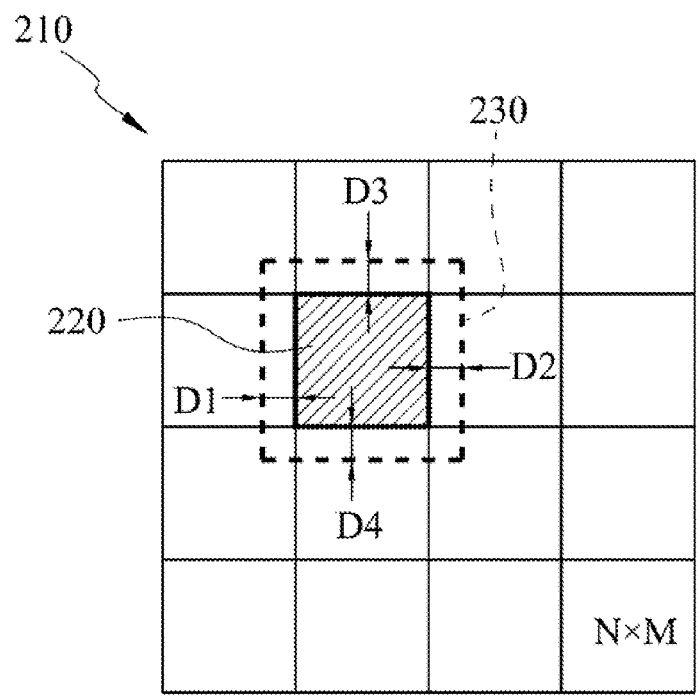
FIG. 2A shows a schematic view of a block datum and a regional datum of FIG. 1.

FIG. 1 shows a flow chart of a block-based digital refocusing method 100 according to one embodiment of the present disclosure; FIG. 2A shows a schematic view of a block datum 220 and a regional datum 230 of FIG. 1; and FIG. 26 shows a schematic view of a block datum 220 and a regional datum 230 according to one example of the block-based digital refocusing method 100 of FIG. 1. In FIG. 1, the block-based digital refocusing method 100 includes a capturing step 110, a dividing step 120, a selecting step 130, a refocusing step 140 and a combining step 150.

In detail, the capturing step 110 is for capturing one picture datum 210. The picture datum 210 can be a digital picture, and the picture datum 210 includes a picture depth map for conducting the refocusing computation. In addition, the picture datum 210 can include a plurality of view picture data for conducting the refocusing computation.

The dividing step 120 is for dividing the picture datum 210 into a plurality of block data 220. A block size of each of the block data is N×M pixels, wherein N is greater than or equal to 2 and M is greater than or equal to 2. In the example illustrated in FIG. 2B, both N and M are equal to 8. The shape of each of the block data 220 can be a polygon. Herein, the shape of each of the block data 220 is described as a rectangle.

Figure 2B:
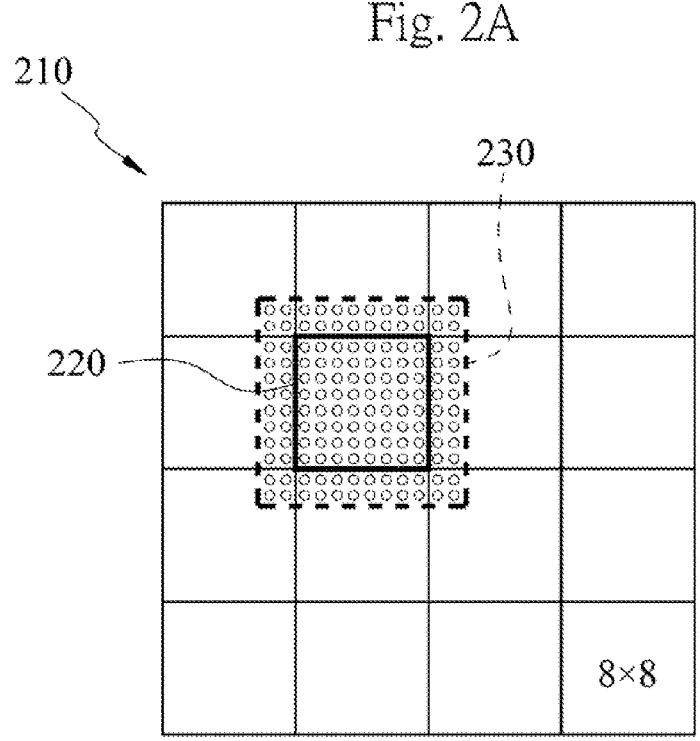
FIG. 2B shows a schematic view of a block datum and a regional datum according to one embodiment of the block-based digital refocusing method of FIG. 1.

The selecting step 130 is for defining a regional datum 230 according to each of the block data 220. A block size of each of the regional data 230 is greater than or equal to the block size of each of the block data 220. As shown in FIG. 2A, the block size of each of the regional data 230 is greater than the block size of each of the block data 220. The block size of each of the block data 220 is N×M pixels. The block size of each of the regional data 230 is (N+D1+D2)×(M+D3+D4) pixels. In FIG. 2A, the block size of each of the regional data 230 is greater than the block size of each of the block data 220 and each two regional data 230 adjacent to each other are partially overlapped with each other. In FIG. 2B, the block size of each of the block data 220 is 8×8 pixels. The block size of each of the regional data 230 is 12×12 pixels, wherein D1, D2, D3 and D4 are all equal to 2. Furthermore, the numbers N and M can be different, and the numbers D1, D2, D3 and D4 also can be distinct. The shape of each of the regional data 230 can be a polygon except a rectangle, such as a triangle.

The refocusing step 140 is for conducting a refocusing computation to obtain a refocused block datum according to each of the regional data 230. The block size of the refocused block datum is equal to a block size of each block data 220 that is corresponding thereto. In the refocusing computation, non-central viewpoints are shifted by a target disparity in each of the regional data 230, then view interpolation is used to produce new target pixels of novel viewpoints and average all of them to obtain the refocused block datum. The view interpolation is for using the nearby view picture data to generate novel viewpoints through coherence of nearby view picture data, camera parameters and picture depth map, wherein the nearby view picture data is for establishing the pixel correspondence by triangulation. In addition, if the picture datum 210 has only one view picture datum, the picture depth map of the view picture datum can be used to interpolate the other view picture datum, so that the original and interpolated view picture data can be further interpolated more different view picture data.

On the other hand, if the aforementioned refocusing computation is used on light field camera, the picture datum 210 will have a plurality of view picture data, and the refocusing step 140 can conduct the refocusing computation according to any one of the view picture data. The regional data 230 of any view picture datum can include the regional data 230 of other view picture data for dealing with a plurality of view picture data. That is, the refocusing step 140 can be for conducting the refocusing computation to generate a refocused block datum according to a plurality of the regional data 230 of different views. Furthermore, the block sizes of the regional data 230 corresponding to different view picture data can be different, wherein the block size of each of the regional data 230 is (N+D1+D2)×(M+D3+D4) pixels. For example, D1, D2, D3 and D4 in the regional data 230 of left view are equal to 0, 8, 0 and 0, respectively. D1, D2, D3 and D4 in the regional data 230 of center view are all equal to 8. D1, D2, D3 and D4 in the regional data 230 of right view are equal to 8, 0, 0 and 0, respectively.

The combining step 150 is for combining each of the refocused block data based on each of the regional data 230 to form a refocused picture datum, wherein the size of the refocused picture datum is equal to the size of the picture datum 210, so that the refocused picture datum is the digital refocused image after refocusing.

Figure 3:
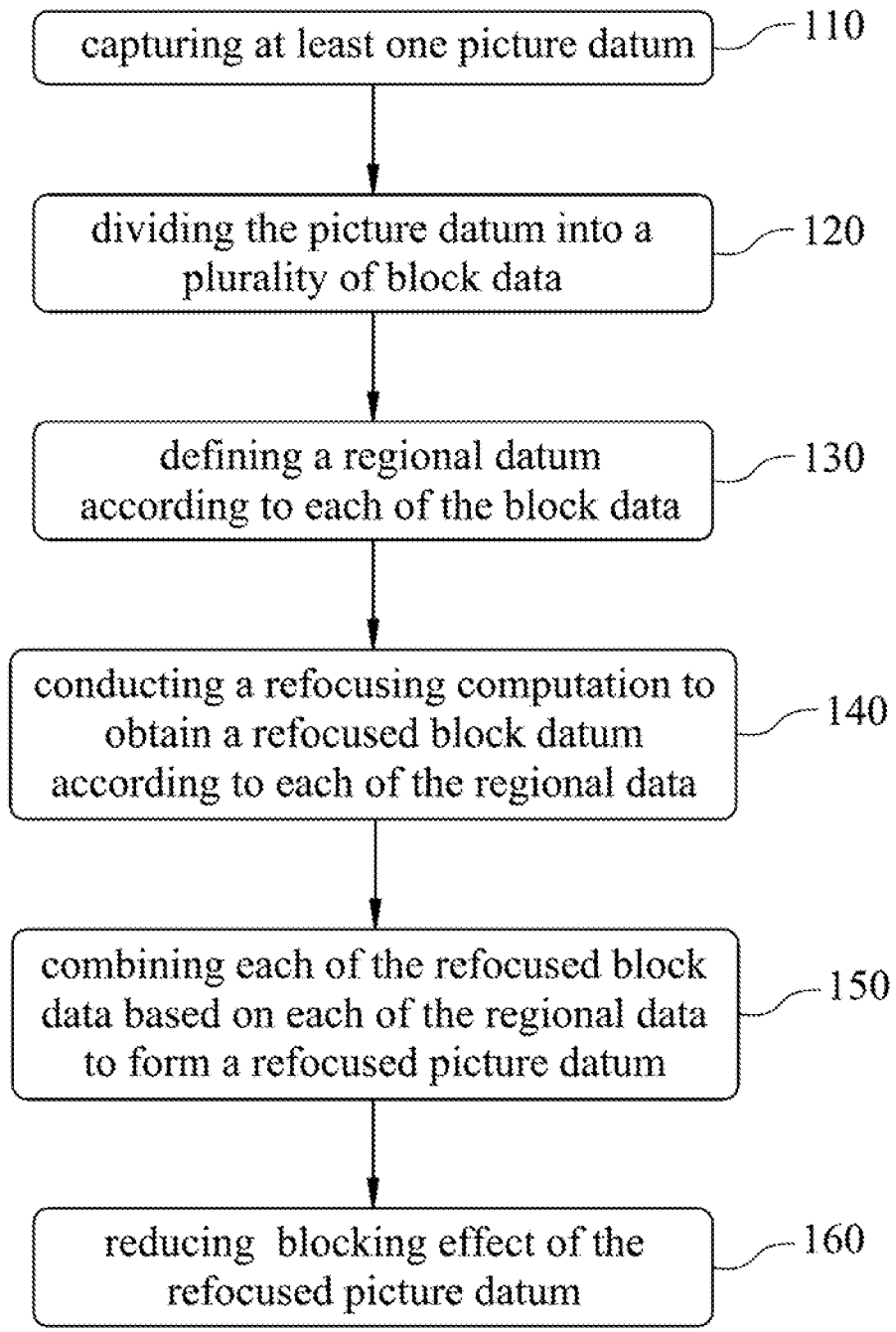
FIG. 3 shows a flow chart of a block-based digital refocusing method according to another embodiment of the present disclosure.

FIG. 3 shows a flow chart of a block-based digital refocusing method 100 according to another embodiment of the present disclosure. In FIG. 3, the block-based digital refocusing method 100 includes a capturing step 110, a dividing step 120, a selecting step 130, a refocusing step 140, a combining step 150 and a deblocking step 160.

In FIG. 3, the detail of the capturing step 110, the dividing step 120, the selecting step 130, the refocusing step 140 and the combining step 150 are the same as the embodiment of FIGS. 1, 2A and 26. In FIG. 3, the block-based digital refocusing method 100 further includes the deblocking step 160. The deblocking step 160 is for reducing blocking effect of the refocused picture datum from the combining step 150, so that the deblocking step 160 is conducted after the combining step 150. The blocking effect means that edges of two adjacent blocks are discontinuous in the block-based image processing when different refocusing algorithms are applied to these two blocks. In order to improve the picture quality, the deblocking step 160 is conducted to remove the discontinuous edges of two adjacent refocused block data. In addition, when the block data 220 are not overlapped with each other, as shown in FIG. 2A, the deblocking step 10 is for reducing the blocking effect of the refocused picture datum by a deblocking filter.

Figure 4:
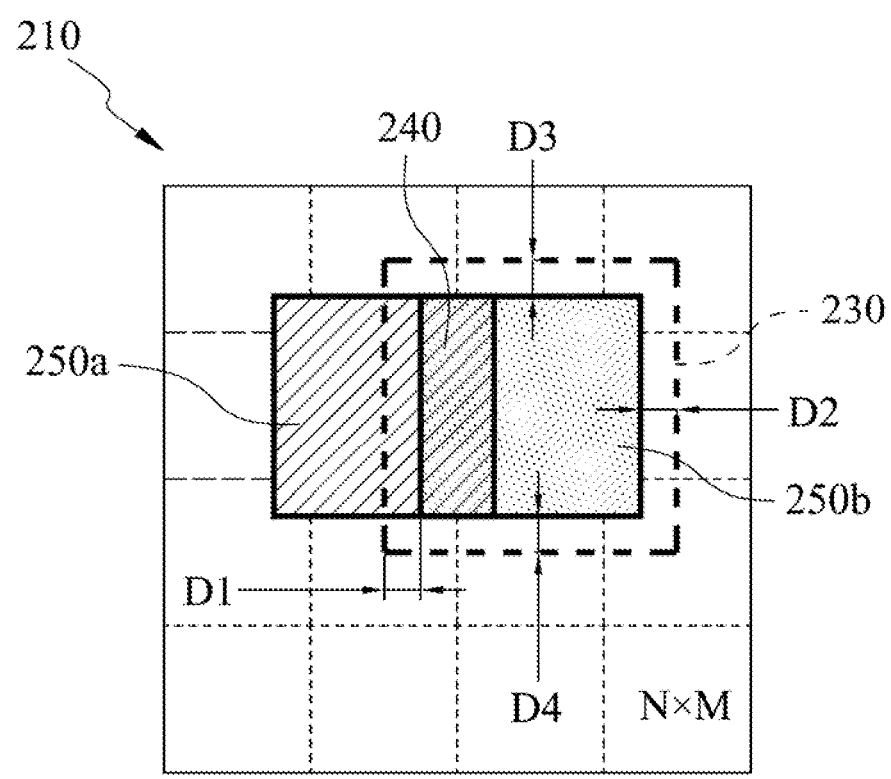
FIG. 4 shows a schematic view of the overlapping region of each of the block data of FIG. 3.

FIG. 4 shows a schematic view of an overlapping region 240 of the refocused block data 250a, 250b of the embodiment of FIG. 3. In FIG. 4, the picture datum 210 is divided into a plurality of block data in the dividing step 120, wherein the adjacent block data are partially overlapped with each other. For example, two refocused block data 250a, 250b are obtained after two adjacent block data overlapped with each other are performed in the selecting step 130, the refocusing step 140 and the combining step 150. The sizes of two refocused block data 250a, 250b are equal to the size of two adjacent block data which are corresponding thereto. Therefore, there is an overlapping region 240 in two refocused block data 250a, 250b, and the deblocking step 160 can be used to reduce the blocking effect in the overlapping region 240. Moreover, the deblocking step 160 can reduce the blocking effect of the refocused picture datum in the overlapping region 240 of two refocused block data 250a, 250b by alpha blending. Alpha blending is a converter which can combine two overlapped region into picture single one via the calculating condition (1) as follows.

$$RGB3=(1-\alpha)*RGB1+\alpha*RGB2 \quad (1)$$

Wherein,
  $\alpha$ is an alpha blending value between 0 and 1;
  RGB1 and RGB2 are the pixel values from two overlapped blocks respectively; and
  RGB3 is pixel values of the composite result.

FIG. 4 shows the horizontal direction of the overlapping region 240. Moreover, the vertical direction of the overlapping region also can be converted by alpha blending to reduce the blocking effect, so that alpha blending can reduce the blocking effect around the edges of each refocused block datum in the deblocking step 160.

Figure 5:
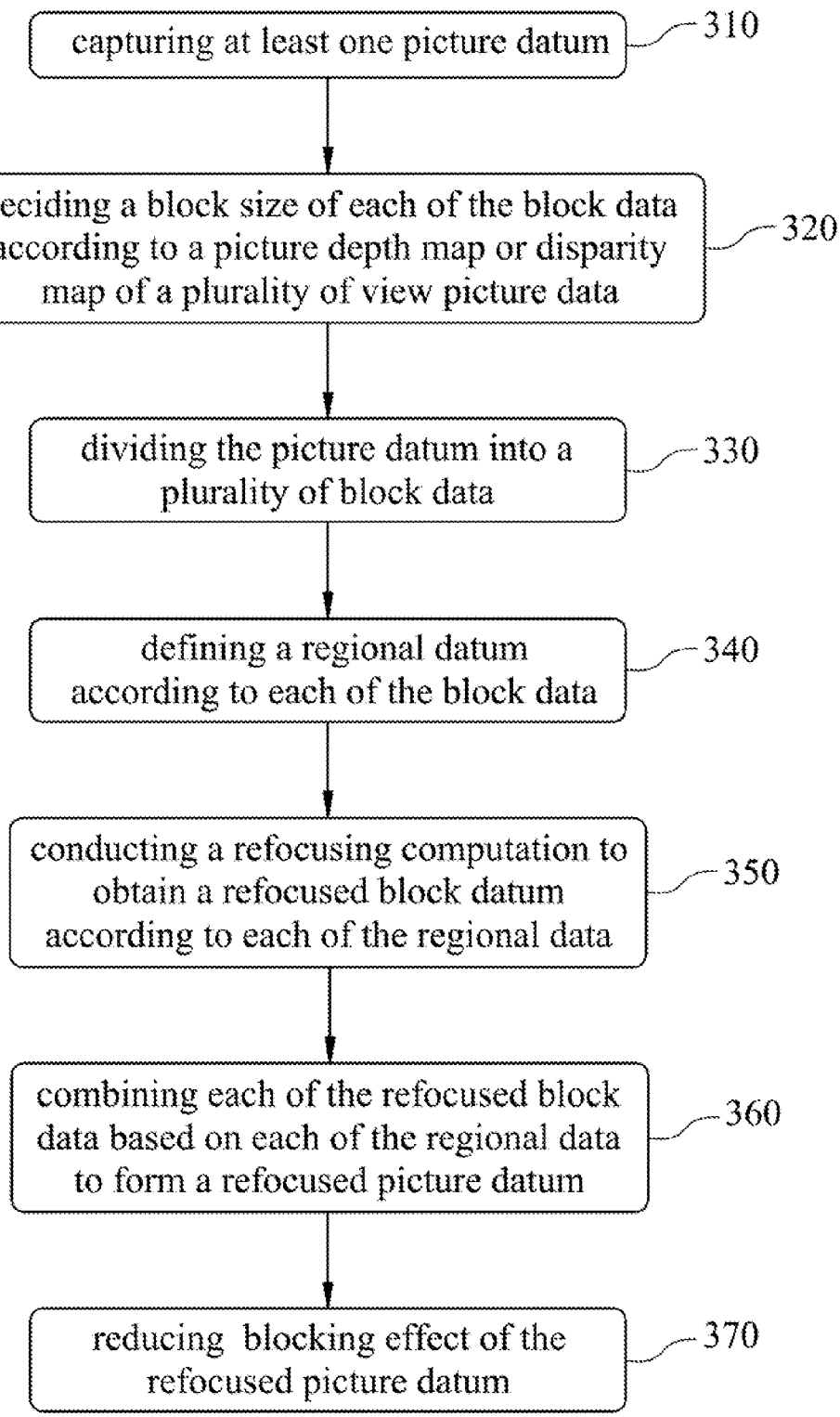
FIG. 5 shows a flow chart of a block-based digital refocusing method according to further another embodiment of the present disclosure.

FIG. 5 shows a flow chart of a block-based digital refocusing method 300 according to further another embodiment of the present disclosure. In FIG. 5, the block-based digital refocusing method 300 includes a capturing step 310, a deciding step 320, a dividing step 330, a selecting step 340, a refocusing step 350, a combining step 360 and a deblocking step 370.

In FIG. 5, the details of the capturing step 310, the dividing step 330, the selecting step 340, the refocusing step 350, the combining step 360 and the deblocking step 370 are the same as the capturing step 110, the dividing step 120, the selecting step 130, the refocusing step 140, the combining step 150 and the deblocking step 160 of FIGS. 2A and 3 respectively. In FIG. 5, the block-based digital refocusing method 300 further includes the deciding step 320. The deciding step 320 is for deciding a block size and a refocusing computation of each of the block data according to a picture depth map or a disparity map of a plurality of view picture data.

For example, when the picture datum 210 has a plurality of view picture data, the block-based digital refocusing method 300 sets the shape of the block data 220 to a square, wherein both N and M are equal to 8, 16 or 32. Then, for each of 32×32 block the deciding step 320 decides the best block partition and the corresponding refocusing computation by minimizing the computation requirement. The block partition consists of a quad tree with 8×8, 16×16, or 32×32 blocks. The computation requirement for each block size and each refocusing computation can be evaluated according to the disparity map of the view picture data. For the refocusing computation using view interpolation, the computation complexity is determined by the interpolated view number which is derived based on the disparity map of the view picture data. Then, the dividing step 330 is conducted according to the block size of the block data 220 and the refocusing computation with minimum computation from the deciding step 320. After the dividing step 330 and the selecting step 340 are conducted, the corresponding refocusing computation decided from the deciding step 320 with minimum computation can be conducted to obtain a refocused block datum according to each of the regional data 230 in the refocusing step 350.

Furthermore, if the absolute disparity difference of the target disparity and the disparities of 8×8, 16×16 and 32×32 of the block data 220 are all equal and larger than a predetermined value, there is at least one distance between the focal plane and the object of the block data 220, that is, the block data 220 is an out-of-focus image. In this case, 32×32 of the block data 220 and the conventional blur processing can be used to reduce the computation without the use of view interpolation because the content of block data 220 is not important. If the absolute disparity difference is less than the predetermined value, the smaller size of 8×8 of the block data 220 may be used to reduce the refocusing computation complexity because there are inconsistent disparities in the block data 220 and different distances between the focal plane and the objects of the block data 220, thereby optimizing the computation of the block-based digital refocusing method 300.

For another example, before the refocusing computation is conducted, the block data 220 and regional data 230 can be downsized. Then, the refocusing computation is conducted to obtain a downsized refocused block datum according to the downsized regional data. Finally, the downsized refocused block datum is upsized to form a refocused block datum. Therefore, the computational complexity of the refocusing computation can be lowered because fewer pixels are processed in the refocusing computation.

Figure 6A:
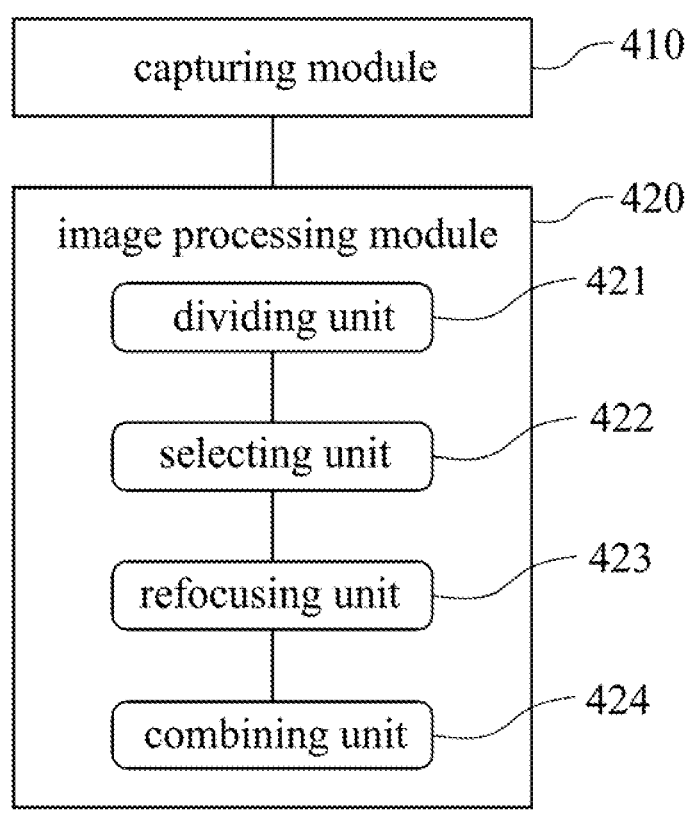
FIG. 6A shows a schematic view of a block-based digital refocusing system according to one embodiment of the present disclosure.

FIG. 6A shows a schematic view of a block-based digital refocusing system 400 according to one embodiment of the present disclosure. In FIG. 6A, the block-based digital refocusing system 400 includes a capturing module 410 and an image processing module 420, wherein the image processing module 420 includes a dividing unit 421, a selecting unit 422, a refocusing unit 423 and a combining unit 424.

The capturing module 410 is for capturing at least one picture datum 210. The image processing module 420 is signally connected to the capturing module 410. The dividing unit 421 is for dividing the picture datum 210 into a plurality of block data 220. The selecting unit 422 is for defining a regional datum 230 according to each of the block data 220. The refocusing unit 423 is for conducting a refocusing computation to obtain a refocused block datum according to each of the regional data 230. The combining unit 424 is for combining each of the refocused block data based on each of the regional data 230 to form a refocused picture datum.

Figure 6B:
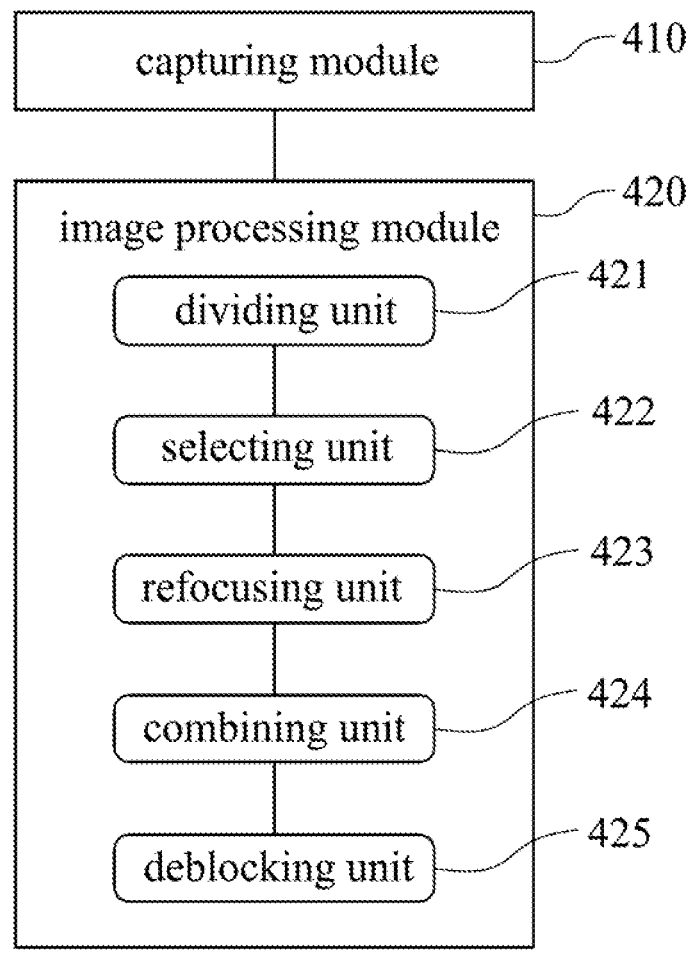
FIG. 6B shows a schematic view of a block-based digital refocusing system according to another embodiment of the present disclosure.

FIG. 6B shows a schematic view of a block-based digital refocusing system 400 according to another embodiment of the present disclosure. In FIG. 6B, the block-based digital refocusing system 400 includes a capturing module 410 and an image processing module 420, wherein the image processing module 420 includes a dividing unit 421, a selecting unit 422, a refocusing unit 423, a combining unit 424 and a deblocking unit 425.

In FIG. 6B, the detail of the capturing module 410, the dividing unit 421, the selecting unit 422, the refocusing unit 423 and the combining unit 424 is the same as the embodiments of FIG. 6A, and will not be described again herein. FIG. 6B, the block-based digital refocusing system 400 further includes the deblocking unit 425 which is for reducing the blocking effect of the refocused picture datum.

Figure 6C:
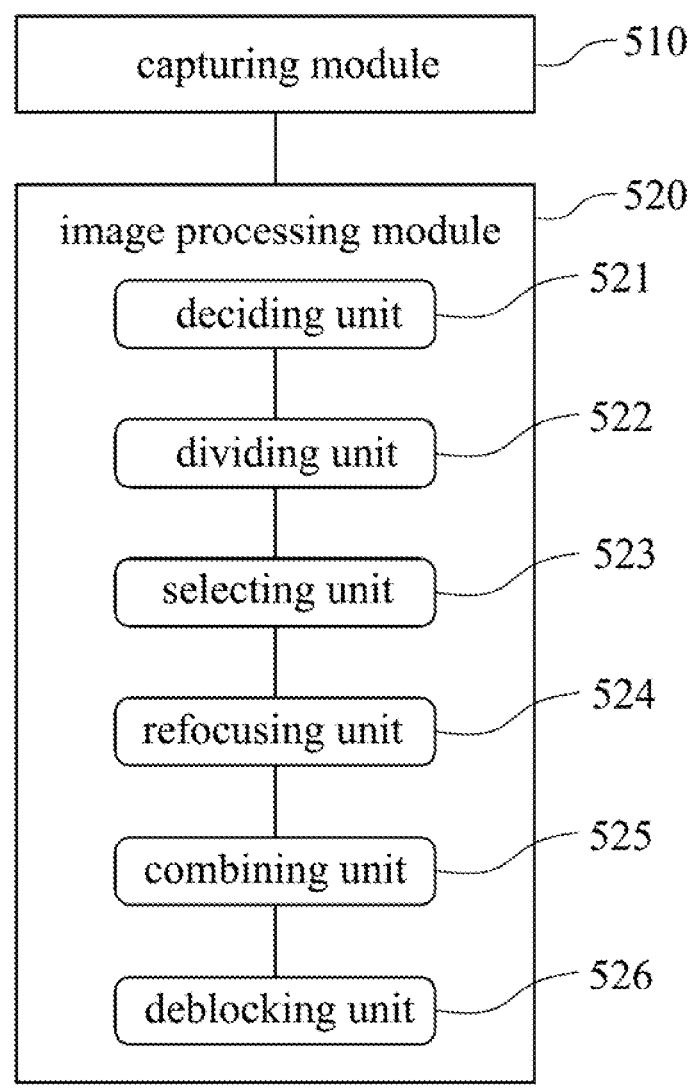
FIG. 6C shows a schematic view of a block-based digital refocusing system according to further another embodiment of the present disclosure.

FIG. 6C shows a schematic view of a block-based digital refocusing system 500 according to further another embodiment of the present disclosure. In FIG. 6C, the block-based digital refocusing system 500 includes a capturing module 510 and an image processing module 520, wherein the image processing module 520 includes a deciding unit 521, a dividing unit 522, a selecting unit 523, a refocusing unit 524, a combining unit 525 and a deblocking unit 526.

In FIG. 6C the detail of the capturing module 510, the dividing unit 522, the selecting unit 523, the refocusing unit 524, the combining unit 525 and the deblocking unit 526 is the same as the capturing module 410, the dividing unit 421, the selecting unit 422, the refocusing unit 423, the combining unit 424 and the deblocking unit 425 of FIG. 6B respectively, and will not be described again herein. In FIG. 6C the block-based digital refocusing system 500 further includes the deciding unit 521 which is for deciding a block size of each of the block data according to a picture depth map or a disparity map of a plurality of view picture data.

The block-based digital refocusing methods 100, 300 of FIGS. 1, 3 and 5 are conducted on the block-based digital refocusing systems 400, 500 of FIGS. 6A, 6B and 6C, respectively.

According to the aforementioned embodiments and examples, the advantages of the present disclosure are described as follows.

1. The block-based digital refocusing system and method thereof of the present disclosure can divide the picture datum into a plurality of block data and individually conduct a refocusing computation to reduce the computation according to each of the regional data which is defined from each of the block data.

2. The system and method of the present disclosure can reduce the blocking effect around the edges of each refocused block datum.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A block-based digital refocusing method, comprising:
providing a capturing step, wherein the capturing step is for capturing at least one picture datum by a capturing module;
providing a dividing step, wherein the dividing step is or dividing the picture datum into a plurality of block data by a dividing unit;
providing a selecting step, wherein the selecting step is for defining a regional datum according to each of the block data by a selecting unit;
providing a refocusing step, wherein the refocusing step for conducting a refocusing computation to obtain a refocused block datum according to each of the regional data by a refocusing unit; and
providing a combining step, wherein the combining step is for combining each of the refocused block data based on each of the regional data to form a refocused picture datum by a combining unit;
wherein the regional data are partially overlapped with each other, and there is an overlapping region in the two refocused block data which are corresponding to the two adjacent block data, respectively;
wherein the picture datum comprises a plurality of view picture data, and the refocusing step is for conducting the refocusing computation according to the view picture data;
wherein in the refocusing computation, a plurality of non-central viewpoints are shifted by a target disparity in each of the regional data, then a view interpolation is used to produce a plurality of new target pixels of a plurality of novel viewpoints and obtain the refocused block datum, and the view interpolation is for using the nearby view picture data to generate the novel viewpoints.

2. The block-based digital refocusing method of claim wherein the dividing step is for deciding a block size of each of the block data according to a predetermined block shape.

3. The block-based digital refocusing method of claim 2, wherein the predetermined block shape is rectangular, the block size of each of the block data is N×M pixels, N is greater than or equal to 2, M is greater than or equal to 2, a block size of each of the regional data is greater than the block size of each of the block data, a block size of the refocused block datum is equal to a block size of each block data which is corresponding thereto, and a size of the refocused picture datum is equal to a size of the picture datum.

4. The block-based digital refocusing method of claim 1, wherein the picture datum comprises a picture depth map, and the refocusing step is for conducting the refocusing computation according to the picture depth map.

5. The block-based digital refocusing method of claim 1, further comprising:

providing a deciding step, wherein the deciding step is for deciding a block size of each of the block data according to a picture depth map or a disparity map of a plurality of view picture data;
wherein the refocusing computation in the refocusing step is decided according to the picture depth map or the disparity map of the view picture data.

6. The block-based digital refocusing method of claim 1, further comprising:
providing a deblocking step, wherein the deblocking step is for reducing a blocking effect of the refocused picture datum.

7. The block-based digital refocusing method of claim 6, wherein the deblocking step is for reducing the blocking effect of the refocused picture datum according to a deblocking filter.

8. The block-based digital refocusing method of claim 6, wherein the deblocking step is for reducing the blocking effect of the refocused picture datum in an overlapping region of each of the block data according to alpha blending.

9. A block-based digital refocusing system, comprising:
a capturing module, for capturing at least one picture datum; and
an image processing module signally connected to the capturing module, the image processing module comprising:
a dividing unit, for dividing the picture datum into a plurality of block data;
a selecting unit, for defining a regional datum according to each of the block data;
a refocusing unit, for conducting a refocusing computation to obtain a refocused block datum according to each of the regional data; and
a combining unit, for combining each of the refocused block data based on each of the regional data to form a refocused picture datum;
wherein the regional data are partially overlapped with each other, and there is an overlapping region in the two refocused block data which are corresponding to the two adjacent block data, respectively;
wherein the picture datum comprises a plurality of view picture data, and the refocusing unit conducts the refocusing computation according to the view picture data;
wherein in the refocusing computation, a plurality of non-central viewpoints are shifted by a target disparity in each of the regional data, then a view interpolation is used to produce a plurality of new target pixels of a plurality of novel viewpoints and obtain the refocused block datum, and the view interpolation is for using the nearby view picture data to generate the novel viewpoints.

10. The block-based digital refocusing system of claim 9, wherein the dividing unit is for deciding a block size of each of the block data according to a predetermined block shape.

11. The block-based digital refocusing system of claim 10, wherein the predetermined block shape is rectangular, the block size of each of the block data is N×M pixels, N is greater than or equal to 2, M is greater than or equal to 2, a block size of each of the regional data is greater than the block size of each of the block data, a block size of the refocused block datum is equal to a block size of each corresponding block data, and a size of the refocused picture datum is equal to a size of the picture datum.

12. The block-based digital refocusing system of claim 9, wherein the picture datum comprises a picture depth map, and the refocusing unit conducts the refocusing computation according to the picture depth map.

13. The block-based digital refocusing system of claim 9, further comprising:
   deciding unit, for deciding a block size of each of the block data according to a picture depth map or a disparity map of a plurality of view picture data;
   wherein the refocusing computation in the refocusing unit is decided according to the picture depth map or the disparity map of the view picture data.

14. The block-based digital refocusing system of claim 9, further comprising:
   a deblocking unit, for reducing a blocking effect the refocused picture datum.

15. The block-based digital refocusing system of claim 14, wherein the deblocking unit is for reducing the blocking effect of the refocused picture datum according to a d blocking filter.

16. The block-based digital refocusing system of claim 14, wherein the deblocking unit is for reducing the blocking effect of the refocused picture datum in an overlapping region f each of the block data according to alpha blending.

\* \* \* \* \*